Feb. 25, 1936.  T. E. JOHNSON  2,031,713
AUTOMATICALLY OPERABLE SEED PLANTER
Filed Sept. 16, 1935  3 Sheets-Sheet 3
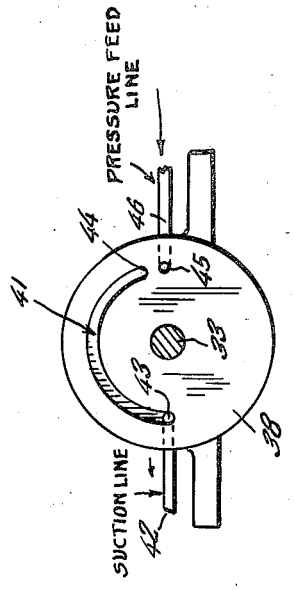
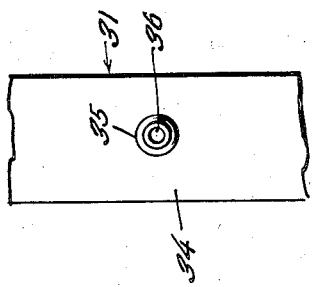
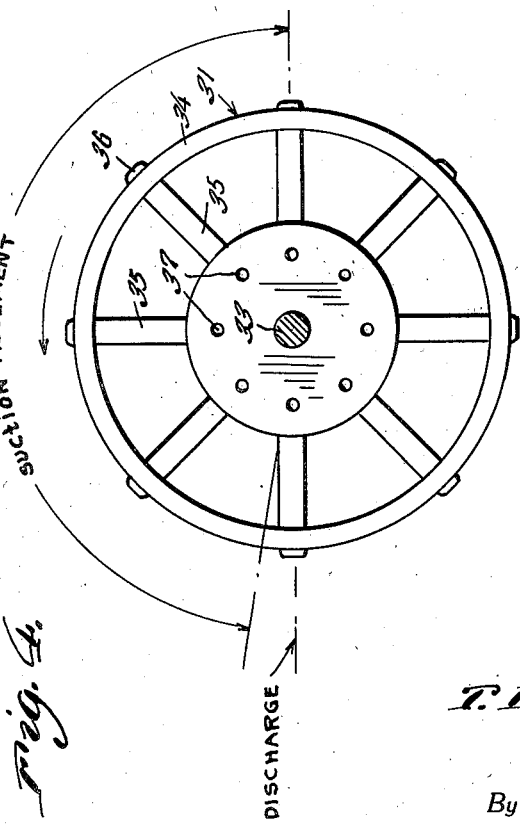
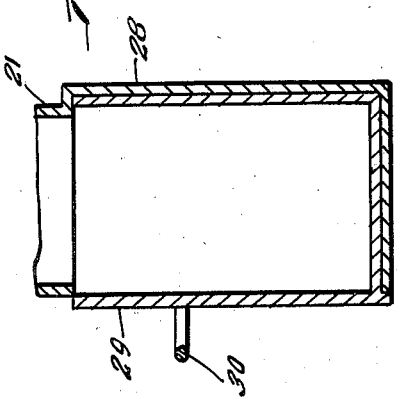
Inventor
T. E. Johnson
By Clarence A. O'Brien
Attorney Patented Feb. 25, 1936

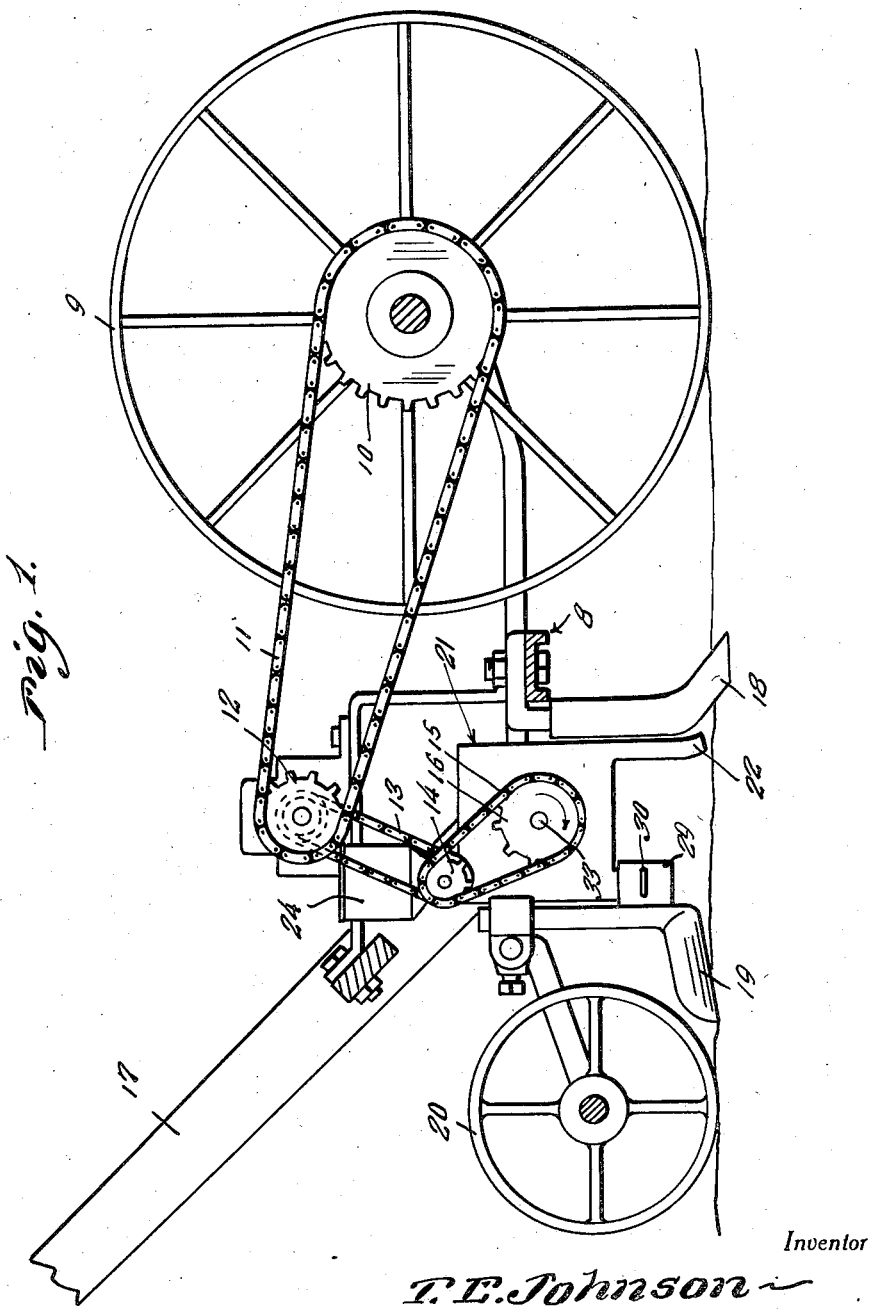

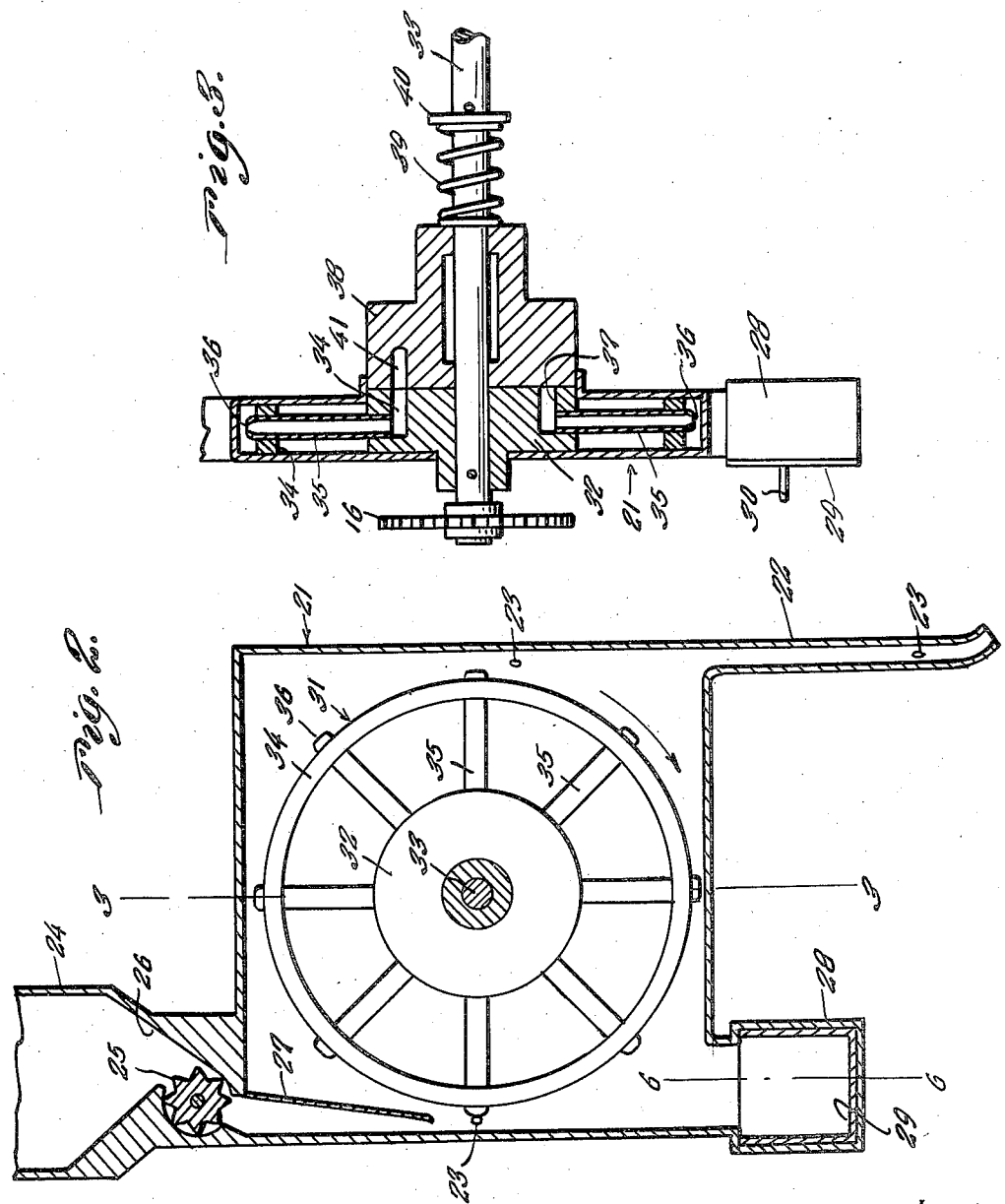

2,031,713

UNITED STATES PATENT OFFICE 2,031,713

AUTOMATICALLY OPERABLE SEED PLANTER

Theodore E. Johnson, Fort Lauderdale, Fla.

Application September 16, 1935, Serial No. 40,849

3 Claims. (Cl. 221—124)

This invention relates to agricultural and farm machinery and more specifically to a portable seed planter wherein certain refinements and mechanical improvements are utilized to provide what may be briefly designated as an automatically operable seed disseminating and planting machine.

The ordinary type of seed planters included in the category in which the present invention is classifiable have to do with those types which are steered or propelled by a walking attendant or suitably actuated by appropriate powering means. Generally there is some sort of a wheel supported frame provided, a hopper for feeding the seed, distributing means for the seed, a furrowing plow at the front and rearwardly disposed furrow covering and packing means.

In the instant development I employ a structure characterized by the aforesaid features but individualized by the incorporation therein of automatically operable seed pick-up and discharging or dropping means. In order to embody the automatic phase of the conception believed to be the essential improvement I have found it expedient and practicable to utilize an arrangement including a pipe equipped wheel properly housed wherein the pipes are in effect mechanical fingers to pick up and properly drop the seed and are associated with a two-way air distributing device providing suction on the one hand and air pressure release means on the other hand.

Or stated otherwise the gist of the invention is predicated upon a unitary assemblage characterized by a seed containing and delivery hopper and a radial multiple piped rotor or wheel with duplex air means cooperable therewith in such a way that as the pipes travel through a predetermined arc they are supplied with suction to catch the seeds and carry them around to the point of delivery at which time air pressure means is utilized for ejecting and dropping the seeds one by one into gravity placement tubes or chutes.

Manifestly my primary aim is to provide a structure which accomplishes this ingenious coordination and so-called automatic result through the instrumentality of a simple and economical arrangement characterized by requisite speed, reliability and efficiency.

Other features and advantages will become more readily apparent from the following description and drawings.

In the accompanying drawings wherein like numerals are employed to designate like parts throughout the views, and Figure 1 is a view principally in elevation but partly in section showing a seed planter embodying, in the main, standard or conventional accessories, but incorporating the unique automatic seed planting means constituting the novelty of the invention.

Figure 2 is a view essentially in section, on an enlarged scale showing the principal features embodied in said automatic seed handling mechanical means.

Figure 3 is a section taken approximately on the plane of the line 3—3 of Figure 2, the view being at right angles to that depicted in Figure 2.

Figure 4 is what may be described as a diagrammatic view showing the multiple radially arranged piped seed carrier wheel, showing that side of the hub formed with the air passages or ports.

Figure 5 is a detail view of a relatively stationary duplex or double acting suction and pressure line unit or head.

Figure 6 is a vertical section on the plane of the line 6—6 of Figure 2.

Figure 7 is a fragmentary detail of the felly or rim of the seed rotor or wheel.

Inasmuch as the general assembly is illustrated in Figure 1, attention naturally comes first to this figure of the drawings. Referring thereto it will be at once observed that the majority of the parts disclosed are more or less conventional. In other words so far as the real novelty of this invention is concerned it has to do with the essential parts shown particularly in Figures 2 and 3 and their companion succeeding minor figures. In order, however, that the reader might discover how the invention is carried into effect in one instance I call attention to the numeral 8, which may be said to designate generally or as a unit an appropriate frame structure. This is provided with ground engaging wheels 9 from which the propulsion power is taken, that is to say the wheel or rather the axle thereof is provided with a large sprocket 10 which drives a sprocket chain 11 which in turn actuates a complemental sprocket 12. This sprocket assembly 12 operates a second sprocket chain 13 which drives sprocket means 14 and operates the remaining or third sprocket chain 15. The latter chain 15 drives what may be designated as a power take-off socket 16. The draft or steering means which may be a handle or the like is indicated at 17 and is suitably constructed. Then toward the front of the machine and depending therefrom and carried on the frame is a plow or blade 18 of suitable form to make the furrow in which seeds are dropped. At the rear is a suitable fixture 19 constructed for covering the seeds after they have been dropped into the furrow and riding behind this is an appropriate packing or tamping wheel or roller 20. The seed planting or disseminating means is mounted between the parts 18 and 19. This means which constitutes the essence of the invention is shown partially in Figure 2. Referring to this figure it will be noted that the numeral 21 designates an appropriate casing or housing. This is provided at its bottom with one or more seed dropping tubes 22 through which the seeds 23 are successively dropped and deposited in the furrow (not shown). At the top of the casing an appropriate hopper 24 and an agitator 25 driven by the sprocket means already described, this being located in the gravity discharge passage or neck 26 which registers with a chute 27 leading into the housing 21 at an appropriate delivery point. Directly beneath the housing is fashioned with a seed depository or trap 28 having a slidable drawer 29 equipped with a suitable hand grip 30. During the operation of the machine certain of the seed are not carried all the way around to the disseminating or planting tube 22 and those seeds which drop into the drawer 29 can be retrieved and put back in the hopper.

Mounted for rotation in the casing 21 is a unit which may be described as combined seed pick-up and dropping means 31. Specifically this is in the form of a wheel and includes a hub 32 mounted on an appropriately journalled shaft 33 carrying the aforementioned sprocket wheel 16. The wheel includes a rim or felly 34 and hollow spokes 35 which are in effect fingers. The outer open ends of the spokes as indicated at 36 extend through and beyond the rim and are formed with restricted holes smaller than the seeds which are used for planting purposes. These tubular spokes are in effect mechanical fingers inasmuch as they first pick-up the seeds by suction thereafter drop the seeds by air pressure release. The rotor fits snugly in the casing and as shown in Figure 3 the hub portion is provided in one face with circumferentially spaced air passages or ducts 37 which register with the inner ends of the tubular fingers. The duct equipped face of the hub rides in rotating contact with the relatively stationary casting 38 which is fixedly mounted on the frame in any appropriate way. The casting is formed with bearings to accommodate the shaft 33 and spring means 39 is associated with the casting and shaft as well as an abutment collar 40. This keeps the parts 32 and 38 in proper matching and meeting contact. The part 38 might well be referred to as a fixed dividual air distributing head which has the double function of affording on the one hand a limited but sustained suction, and the other hand supplies a momentarily active air pressure jet for seed releasing purposes. This phase of the invention is brought out to advantage in Figure 5 wherein it will be observed that the casting is substantially disk like in form to match the hub and is provided in that face which matches the hub with a segmental groove 41. A suction line or pipe 42 is connected with one end of the groove as indicated at the point 43. The suction is developed from a suitable pump (not shown). The opposite end of the groove or slot indicated at 44 terminates within the vicinity of an air pressure intake port or orifice 45 which receives air from a pressure feed line or pipe 46 also connected with the pump. It will be evident from examining Figures 3, 4 and 5 in succession that as the tube or finger equipped rotor wheel turns the passages 37 register with the groove 41. This is during a limited arc of the complete circle of rotation as will be clear from the legend appearing on the drawings in Figures 4 and 5. While this predetermined series of groups of passages 37 register with the slot suction is created in the respective or companion tubes 35 with the result that the seeds dropping down from the hopper are picked up and caught on the ends of the tubes as illustrated in Figure 2. Then as the seed loaded tube reaches point 41 at the discharge end of the groove the suction is released and a jet of air is shot from the port 45 into the then registering passage 37 with the result that the air current ejects or forcibly releases the seed so that it drops down into the conduit 22 as shown in Figure 2.

It goes without saying that the essence of the invention is not to be confused with the portable support or frame structure since this may be of any type or form. Nor is it material that the power be supplied by socket wheels and chain means. On the contrary the novelty is predicated, as before indicated, on the means broadly and specifically disclosed primarily in Figures 2 to 5 of the drawings. Fundamentally the principle founded on the broad inventive conception reduces to practice a feasible or practicable mechanical means which automatically picks up the seeds of an appropriate delivery hopper, carries the seeds to a predetermined point, releases the seeds and drops them into the furrow by appropriate guiding passages. More specific than this however is the automatic air control mechanical finger means which is substantially self-acting and capable of operating in desired timed or intermittent ways to satisfactorily accomplish the seed planting operation.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

1. In a structure of the class described, a substantially rectangular casing having a gravity feed seed containing and delivery hopper at the top of one corner portion thereof, that portion of the bottom of the casing directly beneath said hopper being fashioned to provide a seed collecting depository and having a slidably mounted removable collection drawer, the frontal portion of the bottom of said casing being provided with a depending seed dropping and placement tube, and an air controlled seed pick-up and dropping wheel mounted for rotation in said casing and proportioned and arranged for cooperation with the hopper, seed depository, and placement tube.

2. In a structure of the class described, a relatively fixed casting provided with bearing means and formed in one surface with segmental suction groove and adjacent one end of the groove with an air inlet orifice, a suction line connected with one end of the groove, a pressure feed line connected with said orifice, a relatively fixed casing located adjacent and attached to said casting, said casing including a seed containing and delivery hopper, surplus seed retrieving means beneath said hopper, and a seed placement tube on the frontal portion thereof, a shaft mounted for rotation in said casting extending through the casing, a pneumatic wheel mounted in the casing and including a hub attached to the shaft, said hub being provided with circumferentially spaced passages successively registerable with the groove and air inlet orifice, tubular radial spokes attached to the hub and communicating at their inner ends with said passages, and a concentric rim surrounding the hub and fitted tightly for rotation between the side walls of the casing, the outer ends of said tubular spokes extending through and beyond circumferentially spaced apertures in said rim.

3. In a structure of the class described, an air distributing head provided in one face with a segmental suction groove, a suction line connected with said groove, said head being further provided adjacent one end of the groove with an air inlet orifice, a pressure feed line connected with the head and in communication with said orifice, a relatively rotatable wheel including a hub in matched relationship with said head, said hub being provided with circumferentially spaced passages successively registrable with the groove and air inlet orifice, said wheel also including tubular spokes communicating at their inner ends with said passages and being open at their outer ends in the manner and for the purposes described.

THEO. E. JOHNSON.